United States Patent
Jung et al.

(10) Patent No.: US 10,629,919 B2
(45) Date of Patent: Apr. 21, 2020

(54) SEPARATING PLATE, METHOD FOR MANUFACTURING SAME, AND FUEL CELL STACK COMPRISING SAME

(71) Applicant: LG CHEM, LTD., Seoul (KR)

(72) Inventors: Hye Mi Jung, Daejeon (KR); Jae Choon Yang, Daejeon (KR); Jee Hoon Jeong, Daejeon (KR); Chang Sun Kong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 91 days.

(21) Appl. No.: 15/580,034

(22) PCT Filed: Jun. 30, 2016

(86) PCT No.: PCT/KR2016/007043
§ 371 (c)(1),
(2) Date: Dec. 6, 2017

(87) PCT Pub. No.: WO2017/007174
PCT Pub. Date: Jan. 12, 2017

(65) Prior Publication Data
US 2018/0145346 A1  May 24, 2018

(30) Foreign Application Priority Data

Jul. 3, 2015  (KR) ................... 10-2015-0094967
Jun. 30, 2016  (KR) ................... 10-2016-0082317

(51) Int. Cl.
*H01M 8/0258* (2016.01)
*H01M 8/026* (2016.01)
(Continued)

(52) U.S. Cl.
CPC ......... *H01M 8/0258* (2013.01); *H01M 8/026* (2013.01); *H01M 8/0254* (2013.01);
(Continued)

(58) Field of Classification Search
None
See application file for complete search history.

(56) References Cited

U.S. PATENT DOCUMENTS

| 6,979,517 B2 | 12/2005 | Goda et al. |
| 2009/0181281 A1 | 7/2009 | Piecuch et al. |

(Continued)

FOREIGN PATENT DOCUMENTS

| CA | 2925249 A1 | 4/2015 |
| EP | 2680354 A1 | 1/2014 |

(Continued)

OTHER PUBLICATIONS

International Search Report (PCT/ISA/210) issued in PCT/KR2016/007043, dated Sep. 12, 2016.

(Continued)

*Primary Examiner* — Wojciech Haske
(74) *Attorney, Agent, or Firm* — Birch, Stewart, Kolasch & Birch, LLP

(57) ABSTRACT

The present invention relates to a separating plate, a method for manufacturing the same, and a fuel cell stack comprising the same. An aspect of the present invention provides a separating plate comprising: a plurality of channels extending in elongated shapes along a first direction, respectively; and a plurality of riblet elements provided to connect side walls of two adjacent channels along a second direction, which is perpendicular to the first direction, wherein the plurality of riblet elements, which connect side walls of two adjacent channels, are spaced by a predetermined interval along the first direction, and a separating plate, which is provided with a first opening, is provided between two riblet elements, which are adjacent to each other along the first direction.

18 Claims, 4 Drawing Sheets

(51) Int. Cl.
*H01M 8/0254* (2016.01)
*H01M 8/2465* (2016.01)
H01M 8/0206 (2016.01)
H01M 8/1018 (2016.01)
H01M 8/0213 (2016.01)

(52) U.S. Cl.
CPC ........ *H01M 8/2465* (2013.01); *H01M 8/0206* (2013.01); *H01M 8/0213* (2013.01); *H01M 2008/1095* (2013.01); *Y02P 70/56* (2015.11)

(56) References Cited

U.S. PATENT DOCUMENTS

| | | |
|---|---|---|
| 2013/0052551 A1 | 2/2013 | Ishikawa |
| 2016/0233522 A1 | 8/2016 | Konno |

FOREIGN PATENT DOCUMENTS

| | | |
|---|---|---|
| JP | 2012-48825 A | 3/2012 |
| JP | 2012-243570 A | 12/2012 |
| JP | 2013-103231 A | 5/2013 |
| JP | 2015-69968 A | 4/2015 |
| KR | 10-1347770 B1 | 1/2014 |

OTHER PUBLICATIONS

Extended European Search Report for European Application No. 16821580.4, dated Nov. 22, 2018.

[Figure 1]
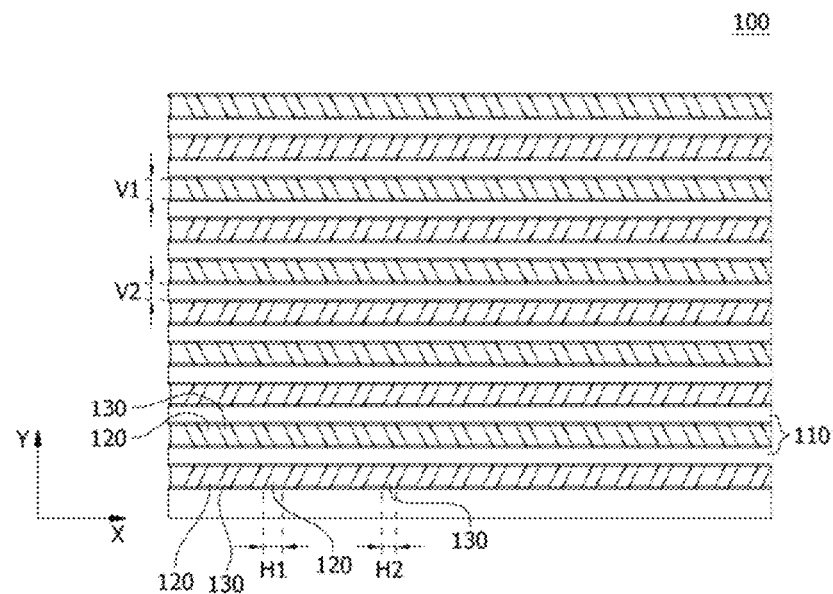
[Figure 2]
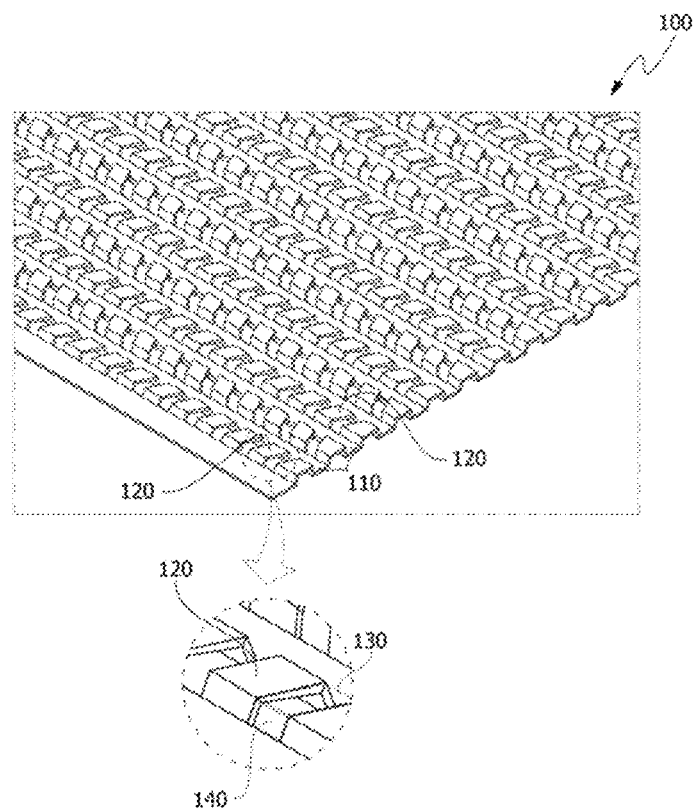

[Figure 3]
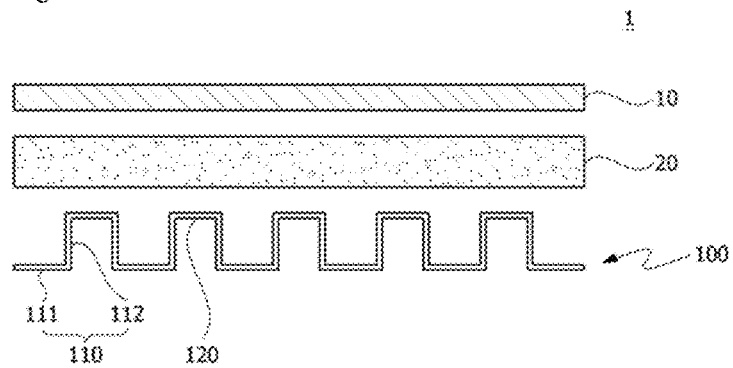
[Figure 4]
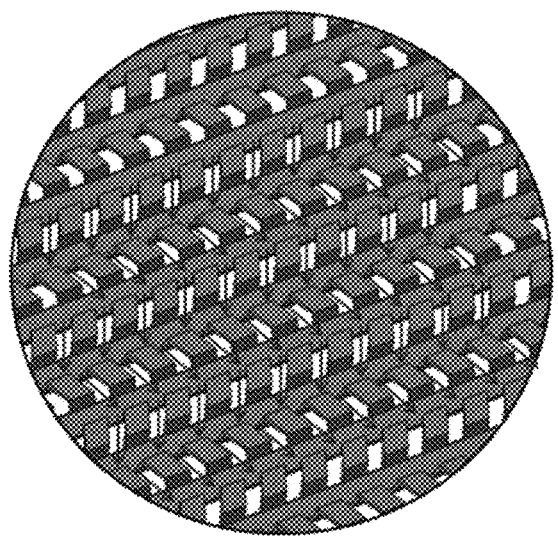
[Figure 5]
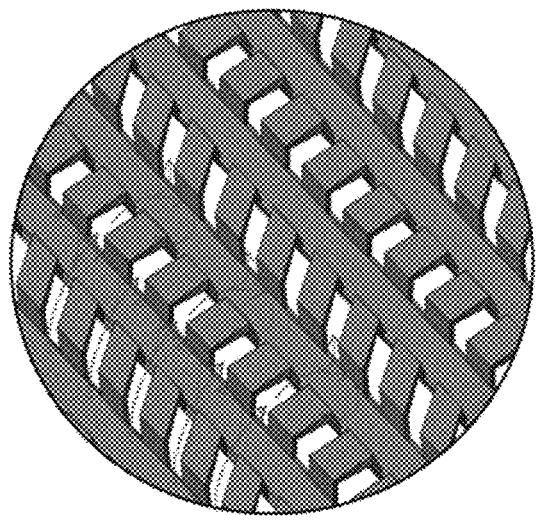

[Figure 6]
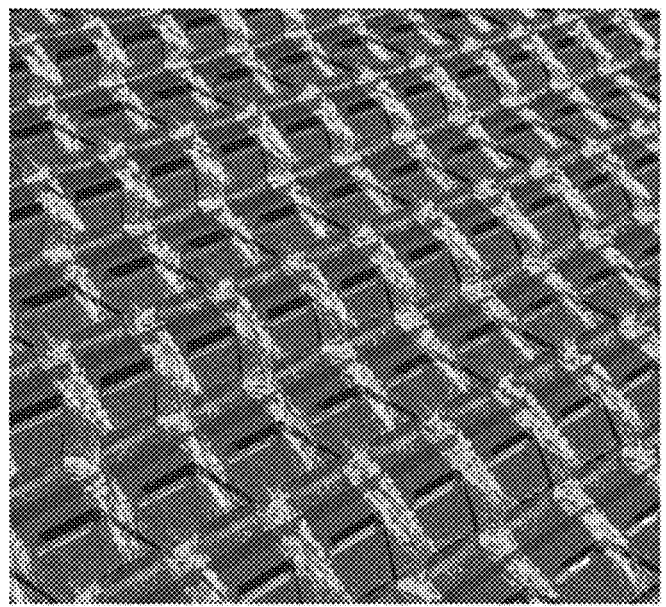
[Figure 7]
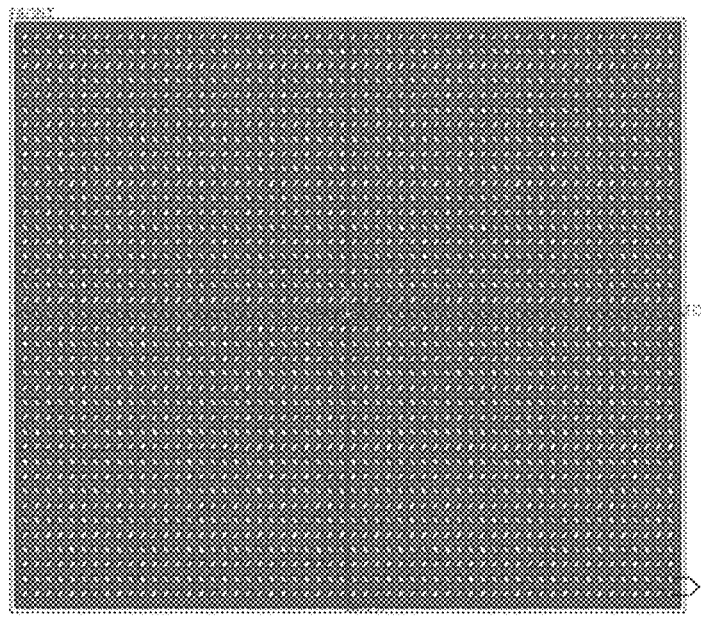

[Figure 8]
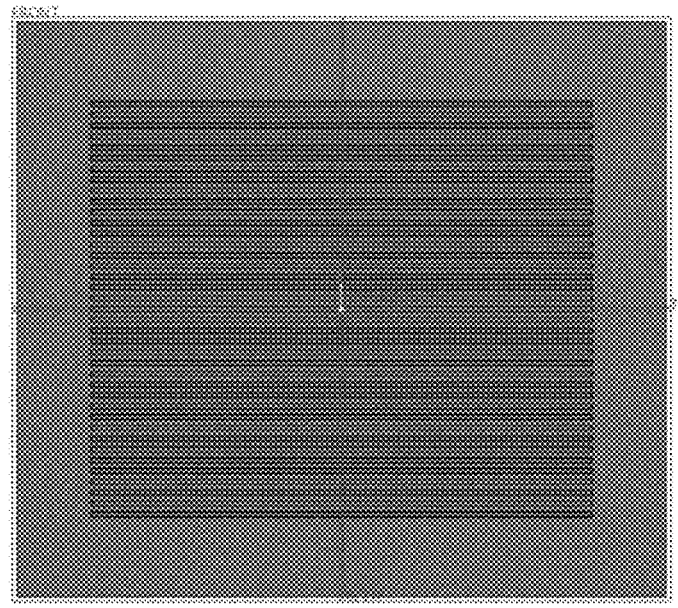

SEPARATING PLATE, METHOD FOR MANUFACTURING SAME, AND FUEL CELL STACK COMPRISING SAME

TECHNICAL FIELD

The present invention relates to a separating plate, a method for manufacturing the same, and a fuel cell stack comprising the same.

The present application claims the benefit of priority based on Korean Patent Application No. 10-2015-0094967 filed on Jul. 3, 2015 and Korean Patent Application No. 10-2016-0082317 filed on Jun. 30, 2016, the disclosures of which are incorporated herein by reference in their entireties.

BACKGROUND ART

Generally, a fuel cell is an energy conversion device that generates electrical energy through an electrochemical reaction between a fuel and an oxidizer and has an advantage that electric power can be consistently generated as long as the fuel is continuously supplied.

A polymer electrolyte membrane fuel cell (PEMFC), which uses a polymer membrane capable of permeating hydrogen ions as an electrolyte, has a low operating temperature of about 100° C. or less as compared to other types of fuel cells, and has advantages of high energy conversion efficiency, high output density and fast response characteristics. Besides, since it can be miniaturized, it can be provided as portable, vehicle and household power supplies.

The polymer electrolyte membrane fuel cell stack comprises a membrane-electrode assembly (MEA) having an electrode layer formed by applying an anode and a cathode, respectively, around an electrolyte membrane composed of a polymer material, a gas diffusion layer (GDL) for serving to distribute reaction gases evenly over the entire reaction region and to transfer the electrons generated by the oxidation reaction of the anode electrode toward the cathode electrode, a separating plate (bipolar plate) for supplying reaction gases to the gas diffusion layer and discharging the water generated by the electrochemical reaction outside, and a gasket of rubber materials with elasticity for preventing leakage of the reaction gases and the cooling water by being disposed on the outer circumference of the reaction region in the separating plate or the membrane-electrode assembly.

Conventional separating plates for a fuel cell stack are configured such that the flows of the reaction gas and the resulting water travel in the same direction through two-dimensional channels or are distributed and discharged through intersecting three-dimensional solid shapes. However, they have a structure that is not suitable for efficiently discharging a variable amount of water under various operation conditions, thereby having a problem of deteriorating the performance of the fuel cell stack.

DISCLOSURE

Technical Problem

It is an object of the present invention to provide a separating plate capable of promoting mass transfer of a reaction gas in a fuel cell reaction surface through laminar-turbulent transition flows and drag minimization of fluids by applying riblet elements, a method for manufacturing the same, and a fuel cell stack comprising the same.

In addition, it is another object of the present invention to provide a separating plate capable of improving heat and mass transfer characteristics, a method for manufacturing the same, and a fuel cell stack comprising the same.

Furthermore, it is another object of the present invention to provide a separating plate capable of effectively discharging condensed water, a method for manufacturing the same, and a fuel cell stack comprising the same.

Technical Solution

To solve the above-described objects, according to one aspect of the present invention, there is provided a separating plate comprising: a plurality of channels extending in elongated shapes along a first direction, respectively; and a plurality of riblet elements provided to connect side walls of two adjacent channels along a second direction orthogonal to the first direction.

In addition, the plurality of riblet elements connecting side walls of two adjacent channels are spaced apart at a predetermined interval along the first direction and first openings are provided between two adjacent riblet elements along the first direction.

Furthermore, the riblet elements are provided so as to have a parallelogram shape.

Also, two adjacent riblet elements along the second direction are provided so as to have a symmetric or anti-symmetric shape on the basis of the channel.

In addition, the width of the riblet element along the second direction may be formed larger than the width of the channel.

Furthermore, the first openings may be provided to have a parallelogram shape.

Also, the first openings may be provided such that each of a pair of long opposite sides is inclined with respect to the first direction and the second direction.

In addition, the riblet elements may be provided such that each of a pair of long opposite sides is inclined with respect to the first direction and the second direction.

Furthermore, the length of the riblet element along the first direction may be formed longer than the length of the first opening.

Also, second openings connected to the first openings and formed in the side walls of the channels may be provided.

In addition, the second opening may have a parallelogram shape.

Furthermore, according to another aspect of the present invention, there is provided a fuel cell stack comprising: a membrane-electrode assembly; a gas diffusion layer provided on one side of the membrane-electrode assembly; and a separating plate provided to contact the gas diffusion layer in some areas.

Here, the separating plate comprises a plurality of channels extending in elongated shapes along a first direction, respectively; and a plurality of riblet elements provided to connect side walls of two adjacent channels along a second direction orthogonal to the first direction and disposed to contact the gas diffusion layer.

In addition, the plurality of riblet elements connecting the sidewalls of two adjacent channels are spaced apart at a predetermined interval along the first direction, where first openings are provided between two adjacent riblet elements along the first direction and second openings connected to the first openings are provided in the side walls of the channels.

Furthermore, the riblet elements are provided to have a parallelogram shape, where two adjacent riblet elements along the second direction are provided to have a symmetric or an antisymmetric shape on the basis of the channel.

Also, according to still another aspect of the present invention, there is provided a method for manufacturing a separating plate, comprising steps of: forming a pair of opening patterns having a symmetric or antisymmetric shape on a plate along its length direction; and stamping the plate along its length direction so that riblet elements corresponding to the opening pattern areas and channels corresponding to the areas adjacent to the opening patterns have a stepped structure.

Here, the openings are provided to have a parallelogram shape.

Furthermore, the opening pattern may be formed through etching or punching.

Advantageous Effects

As described above, the separating plate, the method for manufacturing the same and the fuel cell stack comprising the same, related to one embodiment of the present invention, have the following effects.

It is possible to efficiently distribute the gas flow and the liquid (e.g., water) flow in the separating plate and to optimize the gas flow and the liquid (e.g., water) flow in the separating plate. Particularly, the condensed water can be prevented from accumulating in the separating plate, and the condensed water can be effectively discharged by the convection flow and the bending flow path at the upper end of the riblet elements.

In addition, heat and mass transfer characteristics can be improved through laminar-turbulent flow transition, vortex formation and turbulent boundary layer disturbance induction. Particularly, a vortex can be formed by the wall surface collision of the fluid passing through the reaction gas flow path having a parallelogram shape, and the heat/mass transfer can be promoted and the discharge of the condensed water at the upper end of the riblet elements can be induced, by the double diffusion convection effect of the reaction gas.

Furthermore, the manufacturing cost and the manufacturing time of the separating plate can be reduced.

BRIEF DESCRIPTION OF DRAWINGS

FIG. 1 is a top view of a separating plate related to one embodiment of the present invention.

FIG. 2 is a perspective view of the separating plate shown in FIG. 1.

FIG. 3 is a cross-sectional view of a fuel cell stack related to one embodiment of the present invention.

FIG. 4 is a perspective view for explaining the flow of water in the separating plate constituting the fuel cell stack.

FIG. 5 is a perspective view for explaining the flow of gas in the separating plate constituting the fuel cell stack.

FIG. 6 is a simulation result for explaining vortex formation at the upper end of the riblet elements.

FIGS. 7 and 8 are top views of a plate for explaining a method for manufacturing a separating plate.

MODE FOR INVENTION

Hereinafter, the separating plate according to one embodiment of the present invention, the method for manufacturing the same, and the fuel cell stack comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a top view of a separating plate (100) related to one embodiment of the present invention, FIG. 2 is a perspective view of the separating plate (100) shown in FIG. 1, and FIG. 3 is a cross-sectional view of a fuel cell stack related to one embodiment of the present invention.

FIG. 4 is a perspective view for explaining the flow of water (blue arrow) in the separating plate (100) constituting the fuel cell stack, FIG. 5 is a perspective view for explaining the flow of gas (red arrow) in the separating plate (100) constituting the fuel cell stack, and FIG. 6 is a simulation result for explaining vortex formation at the upper end of the riblet elements.

A fuel cell stack (1) related to one embodiment of the present invention comprises a membrane-electrode assembly (10) and a gas diffusion layer (20) provided on one side of the membrane-electrode assembly (10), and a separating plate (100). The separating plate (100) is disposed so as to contact the gas diffusion layer (20) in some areas.

The separating plate (100) related to one embodiment of the present invention comprises a plurality of channels (110) extending in elongated shapes along a first direction (x-axis direction or length direction), respectively, and a plurality of riblet elements (120) provided to connect side walls (112) of two adjacent channels (110) along a second direction (y-axis direction or width direction) orthogonal to the first direction. The channel (110) has a structure opened toward the riblet element (120). The channel (110) comprises a bottom portion (111) and side walls (112). The bottom portion (111) and each side wall (112) may be provided to be orthogonal to each other. Also, the bottom portion (111) of the channel (110) and the riblet elements (120) may be provided in parallel.

A plurality of riblet elements (120) connecting the side walls (112) of two adjacent channels (110) are spaced apart at a predetermined interval along a first direction and first openings (130) are provided between two adjacent riblet elements (120) along the first direction.

Here, the width (V1) of the riblet element (120) along the second direction can be formed larger than the width (V2) of the channel (110), and the condensed water can be prevented from accumulating by this structure. The first opening (130) may have various shapes, for example, a circular, elliptical, or polygonal shape. In one embodiment, the first openings (130) may be provided to have a parallelogram shape. Specifically, the first openings (130) may be provided such that each of a pair of long opposite sides is inclined with respect to the first direction and the second direction.

Furthermore, the riblet element (120) may have a shape determined by the shape of the adjacent first openings (130). In one embodiment, the riblet element (120) can have a polygonal shape, and specifically, the riblet elements (120) can be provided to have a parallelogram shape, where the riblet elements (120) can be provided so that each of a pair of long opposite sides is inclined with respect to the first direction and the second direction.

The length (H2) of the riblet elements (120) along the first direction may be formed longer than the length (H1) of the first openings (130).

In addition, two adjacent riblet elements (120) along the second direction may be provided so as to have a symmetric shape on the basis of the channel (110) (first direction). Also, second openings (140) connected to the first openings (130) may be provided in the side wall (112) area of the channels (110). The second opening (140) may have various shapes and may have, for example, a circular, elliptical, or polygonal shape. In one embodiment, the second opening (140) may have a parallelogram shape.

As described above, the openings provided between the riblet elements (120) may be referred to as first openings (130), and the openings provided on side walls of the channels may be referred to as second openings (140). Specifically, a plurality of riblet elements (120) connecting the side walls (112) of two adjacent channels (110) are spaced apart at a predetermined interval along the first direction, the first openings (130) are provided between two adjacent elements (120) along the first direction and second openings (140) connected to the first openings are provided in side walls (112) of the channels (110).

In addition, a fuel or a reaction gas (also referred to as 'gas') may be supplied to flow through the second openings (140) along the second direction of the separating plate (100). In this case, the gas may flow along the second openings (140) formed in the side walls of the channels (110). As the riblet element (120) has a parallelogram shape, the adjacent second openings (140) along the second direction can form a bending (wave-like) flow path without forming a straight flow path.

Referring to FIG. 6, it can be confirmed that a vortex is formed due to the wall surface collision of the fluid passing through the reaction gas flow path of the parallelogram shape, and through such a structure, the heat/mass transfer can be promoted and the discharge of the condensed water at the upper end of the riblet elements (120) can be induced, by the double diffusion convection effect of the reaction gas.

The separating plate (100) may also be disposed, so that the riblet elements (120) contact the gas diffusion layer (20) and so that in a state where the separating plate (100) is turned upside down, the channels (110) contact the gas diffusion layer (20). The separating plate (100) having the same structure can be disposed in the forward or backward direction with respect to the gas diffusion layer (20).

When the riblet elements (120) have been disposed to contact the gas diffusion layer (20), the separating plate (100) comprises a plurality of channels (110) extending in elongated shapes along the first direction, respectively, and a plurality of riblet elements (120) provided to connect the side walls of two adjacent channels along the second direction orthogonal to the first direction and disposed to contact the gas diffusion layer (20). Here, the plurality of riblet elements (120) connecting side walls (112) of two adjacent channels (110) are spaced apart at a predetermined interval along the first direction, first openings (120) are provided between two adjacent riblet elements (120) and second openings (140) connected to the first openings (130) are provided in the side walls (112) of the channels (110). That is, the channels (110) are disposed to open toward the gas diffusion layer (20), and the bottom portion (111) of the channel (110) is spaced from the gas diffusion layer (20).

When the channels (110) have been disposed to contact the gas diffusion layer (20), the separating plate (100) comprises a plurality of channels (110) extending in elongated shapes along the first direction, respectively, and provided to contact the gas diffusion layer (20), and a plurality of riblet elements (120) provided to connect the side walls of two adjacent channels (110) along the second direction orthogonal to the first direction and to be spaced apart from the gas diffusion layer (20). Specifically, the separating plate (100) is disposed so that the bottom portion (111) of the channel (110) contacts the gas diffusion layer (20). In addition, the plurality of riblet elements (120) connecting the side walls of two adjacent channels (110) are spaced apart at a predetermined interval along the first direction, first openings (130) are provided between two adjacent riblet elements (120) along the first direction, and second openings (140) connected to the first openings (130) are provided in the side walls (112) of the channels (110).

FIGS. 7 and 8 are top views of a plate (200) for explaining the method for manufacturing a separating plate. The plate (200) may be a metal/carbon-based thin plate. At this time, as the plate (200) for pattern processing, metal sheets, graphite foil/sheets, metal wire mesh, expanded metal lath, and the like can be widely used.

The method for manufacturing a separating plate comprises a step of forming a pair of opening (210) patterns having a symmetric shape, on a plate (200) along its length direction (see FIG. 7). The pair of openings (210) is spaced apart by a predetermined interval, and the area between them is formed by the above-described channels (110). The term opening (210) pattern means that the plurality of openings (210) are arranged to have a certain rule. The openings (210) in FIG. 7 may correspond to the first and second openings (130, 140) of the separating plate (100). On the other hand, the openings (210) may have a circular, elliptical or polygonal shape (e.g., a parallelogram shape). The opening (210) pattern may be formed through etching or punching.

Referring to FIG. 8, the manufacturing method comprises a step of stamping the plate along its length direction so that riblet elements (120, see FIG. 1) corresponding to the opening (210) pattern areas and channels (110, see FIG. 1) corresponding to the areas adjacent to the opening patterns (210) have a stepped structure.

As in FIG. 7, 2D flow paths may be formed in the plate by forming an opening pattern through an etching or punching process and the separating plate (100) may be molded to have a final 3D riblet shape through a stamping process. Particularly, in the stamping process, as the shape of the simple linear molding flow path is applied, the manufacturing cost of the mold can be reduced, the influence of the sensitivity of the mold manufacturing tolerance can be minimized, and the degree of molding difficulty can be lowered.

Particularly, in the conventional method for manufacturing a separating plate, a production period of at least 2 to 3 months is required for mold production and molding, but according to the manufacturing method related to the present invention, production can be performed within about two weeks, whereby the manufacturing time and the manufacturing cost can be reduced by 50% or more, relative to the conventional art.

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, it is possible to efficiently distribute the gas flow and the liquid (e.g., water) flow in the separating plate and to optimize the gas flow and the liquid (e.g., water) flow in the separating plate. Particularly, the condensed water can be prevented from accumulating in the separating plate, and the condensed water can be effectively discharged by the convection flow and the bending flow path at the upper end of the riblet elements.

The invention claimed is:

1. A separating plate comprising
a plurality of channels extending in elongated shapes along a first direction, respectively; and
a plurality of riblet elements provided to connect side walls of two adjacent channels along a second direction orthogonal to the first direction,
wherein the plurality of riblet elements connecting side walls of two adjacent channels are spaced apart at a predetermined interval along the first direction and first openings are provided between two adjacent riblet elements along the first direction,
the riblet elements are provided to have a parallelogram shape, and
wherein the riblet elements are provided such that each of a pair of long opposite sides is inclined with respect to the first direction and the second direction.

2. The separating plate according to claim 1, wherein the width of the riblet element along the second direction is formed larger than the width of the channel.

3. The separating plate according to claim 1, wherein the first openings are provided to have a parallelogram shape.

4. The separating plate according to claim 3, wherein the first openings are provided such that each of the pair of the long opposite sides is inclined with respect to the first direction and the second direction.

5. The separating plate according to claim 1, wherein second openings connected to the first openings and formed on the side walls of the channels are provided.

6. The separating plate according to claim 5, wherein the second opening has a parallelogram shape.

7. A fuel cell stack comprising
a membrane-electrode assembly;
a gas diffusion layer provided on one side of the membrane-electrode assembly; and
a separating plate according to claim 1, the separating plate being provided to contact the gas diffusion layer in some areas.

8. The fuel cell stack according to claim 7, wherein the width of the riblet element along the second direction is formed larger than the width of the channel.

9. The fuel cell stack according to claim 7, wherein the first openings are provided to have a parallelogram shape and the first openings are provided such that each of a pair of long opposite sides is inclined with respect to the first direction and the second direction.

10. The fuel cell stack according to claim 7, wherein the second openings are provided to have a parallelogram shape.

11. The fuel cell stack according to claim 7, wherein a fuel or a reaction gas is supplied to flow through the second openings along the second direction of the separating plate.

12. A method for manufacturing a separating plate according to claim 1, the method comprising steps of:
forming a pair of opening patterns on a plate along its length direction; and
stamping the plate along its length direction so that riblet elements corresponding to the opening pattern areas and channels corresponding to the areas adjacent to the opening patterns have a stepped structure,
wherein said openings are provided to have a parallelogram shape.

13. The method for manufacturing a separating plate according to claim 12,
wherein the opening pattern is formed through etching or punching.

14. The separating plate according to claim 1, wherein two adjacent riblet elements along the second direction are provided to be symmetric with respect to a plane of symmetry extending along the channel and orthogonal to the separating plate.

15. A separating plate comprising
a plurality of channels extending in elongated shapes along a first direction, respectively; and
a plurality of riblet elements provided to connect side walls of two adjacent channels along a second direction orthogonal to the first direction,
wherein the plurality of riblet elements connecting side walls of two adjacent channels are spaced apart at a predetermined interval along the first direction and first openings are provided between two adjacent riblet elements along the first direction,
the riblet elements are provided to have a parallelogram shape, and
wherein the length of the riblet element along the first direction is formed longer than the length of the first opening.

16. A fuel cell stack comprising
a membrane-electrode assembly;
a gas diffusion layer provided on one side of the membrane-electrode assembly; and
a separating plate according to claim 15, the separating plate being provided to contact the gas diffusion layer in some areas.

17. A method for manufacturing a separating plate according to claim 15, the method comprising steps of:
forming a pair of opening patterns on a plate along its length direction; and
stamping the plate along its length direction so that riblet elements corresponding to the opening pattern areas and channels corresponding to the areas adjacent to the opening patterns have a stepped structure,
wherein said openings are provided to have a parallelogram shape.

18. The separating plate according to claim 15, wherein two adjacent riblet elements along the second direction are provided to be symmetric with respect to a plane of symmetry extending along the channel and orthogonal to the separating plate.

* * * * *